3,061,584
LIGHT STABILIZATION OF SELF-EXTINGUISHING ALKENYL AROMATIC RESINS
Charles F. Raley, Jr., Midland, Mich., assignor to The Dow Chemical Company, Midland, Mich., a corporation of Delaware
No Drawing. Filed May 31, 1960, Ser. No. 32,530
11 Claims. (Cl. 260—45.8)

The present invention relates to a method of stabilizing flame-proofing agents in alkenyl aromatic resin compositions and to self-extinguishing alkenyl aromatic resin compositions containing stabilizers for the flame-proofing agents.

By an "alkenyl aromatic resin" is meant a solid polymer of one or more polymerizable alkenyl aromatic compounds. The polymeric resin comprises in chemically combined form at least 50 percent by weight of at least one alkenyl aromatic compound having the general formula:

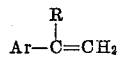

wherein Ar represents an aromatic hydrocarbon radical, or an aromatic halohydrocarbon radical, of the benzene series, and R is hydrogen or the methyl radical. Examples of such alkenyl aromatic resins are the solid homopolymers of styrene, α-methylstyrene, ortho-methylstyrene, metamethylstyrene, para-methylstyrene, ar-ethylstyrene, ar-vinylxylene, ar-chlorostyrene, the solid copolymers of two or more of such alkenyl aromatic compounds with one another; and solid copolymers of one or more of such alkenyl aromatic compounds with minor amounts of other readily polymerizable olefinic compounds such as divinylbenzene, methylmethacrylate, acrylonitrile, etc.

The expressions "non-flammable," "flame-proof," and "self-extinguishing," as employed herein, mean incapable of burning or sustaining a flame for more than 15 seconds after a composition has been fully heated in an open flame and then removed from the flame used to heat the same.

The compounds of this invention may be used when either solid or cellular articles are made from alkenyl aromatic polymers. The alkenyl aromatic polymer may be made by any known method.

If cellular articles are desired, they may be formed by any known method. An especially suitable method is described in U.S. Patent No. 2,450,436. In that method, a volatile substance, commonly known as a blowing agent, is dissolved at superatmospheric pressure in a molten polymer to form a gel. A pressure from an inert gas may be superimposed on the system. The gel is passed into a cooled zone to lower the gel temperature below the critical temperature of the volatile substance and then is released through an aperture to atmospheric pressure. In so doing, the gel rapidly expands and solidifies due to the vaporization of the volatile substance. The article so produced consists of uniformly sized cells separated by thin walls of solid polymer. This article is strong and has excellent insulating properties. However, it is flammable, and as such, is undesirable as an insulating material wherever fire hazards must be avoided.

Self-extinguishing alkenyl aromatic resin compositions are normally prepared by admixing a somewhat unstable polybromo flame-proofing agent such as, for example, acetylene tetrabromide, pentabromomonochlorocyclohexane, and hexabromocyclohexane with an alkenyl aromatic resin in an amount sufficient to give the self-extinguishing characteristics desired. However, the spontaneous decomposition of these polybromo compounds causes yellowing and concomitant degradation of the matrix polymer.

It has now been found that the light-unstable polybromo compounds used in self-extinguishing polymeric compositions may be protected from the degradative effects of light by incorporating in the polymer composition a small but effective proportion of an ultraviolet absorber such as, for example, 2,4-dihydroxybenzophenone, 4-benzoyl-3-hyroxyphenylbenzoate, 5-chloro-2-hydroxybenzophenone, 4,6-dibenzoyl resorcinol, 2-hydroxy-4-methoxybenzophenone, 2,2'-dihydroxy-4,4'-dimethoxybenzophenone, dimethoxybenzophenone, 2-hydroxy-5-methylbenzotriazole, 5-chloro-2-hydroxy-4'-t-butylphenone, 2-hydroxy-4-propoxybenzophenone, and the like.

It has further been found that these ultraviolet absorbers are effective in stabilizing flame-proofing agents in concentrations as low as from about 0.1 to 2.0 percent by weight of the ultraviolet absorber based on the weight of the polymer composition, with the amount required being dependent on the nature and amount of flame-proofing agent present and the particular ultraviolet absorber being used.

The ultra-violet absorbers may be incorporated in the plastic matrix by any of the conventional techniques which give uniform and permanent distribution such as, for example, dry blending before processing in an extruder, use of a mutual solvent, incorporation in the monomer and subsequent polymerization, and the like.

The present invention may be further illustrated, but is not to be construed as limited, by the following examples:

EXAMPLE I

A check sample of polystyrene flameproofed with acetylene tetrabromide was prepared by dissolving 47.5 grams of polystyrene and 2.5 grams of acetylene tetrabromide in methanol. The solvent was then evaporated, the residue ground and molded at 160° C. for 10 minutes forming a test specimen having the dimensions 1/10 x 3/4 x 1½ inches. The difference in percent transmission of visible light at 620 millimicrons and 420 millimicrons ($\Delta T_0$) was determined and the specimen placed in a Fadeometer for 24 hours, after which the difference in percent transmission was again checked ($\Delta T_1$). For this test specimen $\Delta T_0$ was 16.2 and $\Delta T_1$ was 63.5. The difference ($\Delta T_1 - \Delta T_0$) is 47.3, indicating a high degree of yellowing. When the difference ($\Delta T_1 - \Delta T_0$) is less than about 10 any change in color cannot be detected by superficial examination.

In a similar manner, various samples of polystyrene and acetylene tetrabromide (ATB) were prepared which contained varying amounts of 5-chloro-2-hydroxybenzophenone as an ultraviolet absorber, and the samples were subjected to similar treatment and tests. The results are summarized in Table I.

*Table I*

STABILIZATION OF POLYSTYRENE ACETYLENE TETRABROMIDE COMPOSITIONS WITH 5-CHLORO-2-HYDROXYBENZOPHENONE

| Sample | Polystyrene | Grams ATB | Grams UVA | Ratio of UVA to ATB | $\Delta T_1 - \Delta T_0$ |
|---|---|---|---|---|---|
| 1 | 48.0 | 2.0 | 0.25 | 1:8 | 24.8 |
| 2 | 48.5 | 1.5 | 0.25 | 1:6 | 6.7 |
| 3 | 47.5 | 2.5 | 0.5 | 1:5 | 1.0 |
| 4 | 49.0 | 1.0 | 0.25 | 1:4 | 4.0 |
| 5 | 47.5 | 2.5 | 1.0 | 1:2.5 | −0.4 |
| 6 | 49.5 | 0.5 | 0.25 | 1:2 | −0.8 |
| 7 | 47.5 | 2.5 | 10.0 | 4:1 | 2.0 |

In Table I it is seen that a ratio of 1 part of 5-chloro-2-hydroxybenzophenone is sufficient to stabilize up to and including 6 parts of acetylene tetrabromide in polystyrene compositions.

EXAMPLE II

Samples of polystyrene and acetylene tetrabromide (ATB) were blended with various percentages of 5-chloro-2-hydroxybenzophenone and extruded in the form of foams at 160° C. The samples were placed in the Fadeometer for 24 hours and the results observed by visual inspection and recorded in Table II.

*Table II*

| Sample | Wt. Percent ATB | Wt. Percent Ultraviolet Absorber | Fadeometer Test |
|---|---|---|---|
| 1 | 3.0 | 0.5 | Excellent. |
| 2 | 3.0 | 1.0 | Do. |
| 3 | 3.5 | 1.5 | Do. |
| 4 | 4.4 | 0.5 | Fair. |
| 5 | 4.9 | 1.0 | Good. |
| 6 | 4.3 | 1.5 | Excellent. |
| 7 | 2.2 | 0.0 | Poor. |

EXAMPLE III

In a manner similar to that of Example II, samples of polystyrene containing pentabromomonochlorocyclohexane ($C_6H_6Br_5Cl$), as a flame-proofing agent, were dry blended with various amounts of 5-chloro-2-hydroxybenzophenone, and the samples extruded and tested.

*Table III*

| Sample | Wt. Percent $C_6H_6Br_5Cl$ | Wt. Percent Ultraviolet Absorber | Fadeometer Test |
|---|---|---|---|
| 1 | 2.8 | 0.0 | Poor. |
| 2 | 2.8 | 0.5 | Excellent. |
| 3 | 3.0 | 0.0 | Poor. |
| 4 | 3.0 | 0.5 | Excellent to Good. |

EXAMPLE IV

Molded specimens of polystyrene containing acetylene tetrabromide (ATB) as a flame-proofing agent and the indicated ultraviolet absorber were prepared and tested as in Example I with the results indicated in the following table:

*Table IV*

| Sample | Ultraviolet Absorber | Wt. Percent | Wt. Percent ATB | $\Delta T_1 - \Delta T_0$ |
|---|---|---|---|---|
| 1 | 2,2'-Dihydroxy-4,4'-dimethoxybenzophenone. | 2.0 | 5.0 | −2.2 |
| 2 | do | 1.0 | 5.0 | −0.7 |
| 3 | do | 0.5 | 5.0 | 0.0 |
| 4 | do | 0.25 | 5.0 | 5.4 |
| 5 | do | 0.10 | 5.0 | 8.8 |
| 6 | 2,4-Dihydroxybenzophenone. | 2.0 | 5.0 | 9.3 |
| 7 | 4-Benzoyl-3-hydroxy-phenyl benzoate. | 2.0 | 5.0 | 4.0 |
| 8 | 4,6-Dibenzoyl resorcinol | 2.0 | 5.0 | 3.3 |
| 9 | 2-Hydroxy-4-methoxy-benzophenone. | 2.0 | 5.0 | 6.8 |
| 10 | 2,2',4,4'-Tetrahydroxybenzophenone. | 1.0 | 5.0 | 1.0 |
| 11 | do | 0.5 | 5.0 | 3.5 |
| 12 | 5-Chloro-2-hydroxy-4'-t-butylbenzophenone. | 2.0 | 5.0 | 0.0 |
| | | 1.0 | 5.0 | 0.9 |
| | | 0.5 | 5.0 | 5.0 |
| 13 | 2-Hydroxy-4-propoxy-benzophenone. | 2.0 | 5.0 | 7.1 |
| | | 1.0 | 5.0 | 9.8 |
| 14 | 2-Hydroxy-5-methyl benzotriazole. | 2.0 | 5.0 | −1.2 |
| | | 1.0 | 5.0 | −0.8 |
| | | 0.5 | 5.0 | 0.8 |
| | | 0.25 | 5.0 | 5.5 |

EXAMPLE V

Extruded foams of polystyrene containing acetylene tetrabromide (ATB) as a flame-proofing agent and the indicated ultraviolet absorber were prepared and tested as in Example II with the results as indicated in the following table:

*Table V*

| Sample | Ultraviolet Absorber | Wt. Percent | Wt. Percent ATB | Fadeometer Test |
|---|---|---|---|---|
| 1 | 2,2'-Dihydroxy-4,4'-dimethoxybenzophenone. | 0.2 | 3.0 | Excellent. |
| 2 | do | 0.15 | 3.0 | Do. |
| 3 | do | 0.1 | 3.2 | Good to Fair. |
| 4 | do | 0.2 | 4.3 | Excellent. |
| 5 | do | 0.15 | 4.5 | Fair to Poor. |
| 6 | do | 0.1 | 4.4 | Fair. |
| 7 | 2,4-Dihydroxybenzophenone. | 1.5 | 3.4 | Excellent. |
| 8 | do | 2.0 | 3.1 | Do. |
| 9 | do | 1.5 | 3.6 | Good. |
| 10 | do | 2.0 | 3.9 | Do. |
| 11 | 4-Benzoyl-3-hydroxyphenylbenzoate. | 1.0 | 2.9 | Good to Fair. |
| 12 | do | 1.5 | 2.9 | Excellent. |
| 13 | do | 1.0 | 4.0 | Fair. |
| 14 | do | 1.5 | 3.7 | Good to Fair. |
| 15 | 4,6-Dibenzoylresorcinol | 1.0 | 3.1 | Excellent. |
| 16 | do | 1.5 | 3.6 | Good to Fair. |
| 17 | do | 1.0 | 4.3 | Do. |
| 18 | do | 1.5 | 2.9 | Excellent. |

EXAMPLE VI

Molded specimens of polystyrene containing 5 percent by weight of various flame-proofing agents and 1 percent by weight of 5-chloro-2-hydroxybenzophenone as the ultraviolet absorber were prepared and tested as in Example I. In each case a check sample was prepared which did not contain any ultraviolet absorber. The results are tabulated in the following table:

*Table VI*

| Sample | Flame-Proofing Agent | U. V. Absorber | $\Delta T_1 - \Delta T_0$ |
|---|---|---|---|
| 1 | Carbon Tetrabromide | − | 39.3 |
| 2 | do | + | 6.4 |
| 3 | Pentabromoethane | − | 49.0 |
| 4 | do | + | 10.4 |
| 5 | Styrene dibromide | − | 54.3 |
| 6 | do | + | 0.1 |
| 7 | Tetrabromobutane | − | 53.6 |
| 8 | do | + | 0.0 |
| 9 | Hexabromoethane | − | 50.3 |
| 10 | do | + | 3.6 |

EXAMPLE VII

Molded specimens of other polymers containing 5 percent by weight of acetylene tetrabromide as the flame-proofing agent and 1 percent by weight of 5-chloro-2-hydroxybenzophenone as the ultraviolet absorber were prepared and tested as in Example I. In each case a check sample was prepared which did not contain any ultraviolet absorber. The results are tabulated in the following table:

*Table VII*

| Sample | Polymer | U. V. Absorber | $\Delta T_1 - \Delta T_0$ |
|---|---|---|---|
| 1 | Polyvinyltoluene | − | 51.1 |
| 2 | do | + | 0.8 |
| 3 | Styrene-Acrylonitrile Copolymer (70-30). | − | 31.8 |
| 4 | do | + | 0.0 |

In Table I it is seen that from 0.5 to 1.0 percent by weight, based on the flame-proofed polymer composition of 5-chloro-2-hydroxybenzophenone is sufficient to stabilize from 3.0 to 5.0 percent by weight, again based on the flame-proofed polymer composition, of acetylene tetrabromide and that the ratio of 5-chloro-2-hydroxybenzophenone to acetylene tetrabromide must be at least 1 to 6.

Using the same weight basis for calculating percentage compositions, Examples IV and V show that from 0.1 to 0.2 percent of 2,2'-dihydroxy-4,4'-dimethoxybenzophenone, and a ratio of 1:20 of said phenone to acetylene tetrabromide; 0.5 to 1.0 percent of 2,2',4,4'-tetrahydroxybenzophenone or 5-chloro-2-hydroxy-4′-t-butyl benzophenone and a ratio of at least 1:10 of phenone to acetylene tetrabromide, 1 to 1.5 percent of 4-benzoyl-3-hydroxyphenylbenzoate, 4,6-dibenzoyl resorcinol or 2-hydroxy-4-propoxybenzophenone and a ratio of at least 1:2 of phenone to acetylene tetrabromide, 0.2 to 0.25 percent of 2-hydroxy-5-methyl benzotriazole and a ratio of at least 1:25 of triazole to acetylene tetrabromide is sufficient to stabilize acetylene tetrabromide in polymer compositions containing up to 5.0 percent by weight of the acetylene tetrabromide.

Various modifications may be made in the present invention without departing from the spirit or scope thereof and it is understood that I limit myself only as defined in the appended claims.

This application is a continuation-in-part of my application Serial No. 799,461, filed March 16, 1959, now abandoned.

I claim:
1. A light-stabilized, flame-proofed organic thermoplastic composition of matter comprising an intimate admixture of (1) an alkenyl aromatic resin containing from 1.0 to 5.0 weight percent of a flame-proofing agent selected from the group consisting of acetylene tetrabromide, pentabromomonochlorocyclohexane, hexabromocyclohexane, carbon tetrabromide, pentabromoethane, hexabromoethane, styrene dibromide, and tetrabromobutane and (2) an ultraviolet absorbing compound selected from the group consisting of 5-chloro-2-hydroxybenzophenone; 5-chloro-2-hydroxy-4′-t-butylbenzophenone; 2,2′-dihydroxy-4,4′-dimethoxybenzophenone; 2,2′,4,4′-tetrahydroxybenzophenone; 4-benzoyl-3-hydroxyphenylbenzoate; 4,6-dibenzoyl resorcinol; 2,4-dihydroxybenzophenone and 2-hydroxy-4-methoxybenzophenone, 2-hydroxy-4-propoxybenzophenone and 2-hydroxy-5-methylbenzotriazole.

2. The composition of claim 1 wherein the alkenyl aromatic resin is polyvinyltoluene.

3. The composition of claim 2 wherein the flame-proofing agent is acetylene tetrabromide and the ultraviolet absorber is 5-chloro-2-hydroxybenzophenone.

4. The composition of claim 1 wherein the alkenyl aromatic resin is a copolymer of 70 weight percent styrene and 30 weight percent acrylonitrile.

5. The composition of claim 4 wherein the flame-proofing agent is acetylene tetrabromide and the ultraviolet absorber is 5-chloro-2-hydroxybenzophenone.

6. The composition of claim 1 wherein the alkenyl aromatic resin is polystyrene.

7. The composition of claim 6 wherein the flame-proofing agent is acetylene tetrabromide and the ultraviolet absorber is 5-chloro-2-hydroxybenzophenone.

8. The composition of claim 6 wherein the flame-proofing agent is pentabromomonochlorocyclohexane and the ultraviolet absorber is 5-chloro-2-hydroxybenzophenone.

9. The composition of claim 6 wherein the flame-proofing agent is acetylene tetrabromide and the ultraviolet absorber is 2,2′-dihydroxy-4,4′-dimethoxybenzophenone.

10. The composition of claim 6 wherein the flame-proofing agent is acetylene tetrabromide and the ultraviolet absorber is 2,2′,4,4′-tetrahydroxybenzophenone.

11. The composition of claim 6 wherein the flame-proofing agent is acetylene tetrabromide and the ultraviolet absorber is 2-hydroxy-5-methylbenzotriazole.

References Cited in the file of this patent

UNITED STATES PATENTS

| | | |
|---|---|---|
| 2,434,496 | Houtman | Jan. 13, 1948 |
| 2,658,877 | Dreisbach et al. | Nov. 10, 1953 |
| 2,676,946 | McCurdy et al. | Apr. 27, 1954 |
| 2,693,492 | Hoch | Nov. 2, 1954 |
| 2,723,963 | Price et al. | Nov. 15, 1955 |
| 2,773,778 | Hoch et al. | Dec. 11, 1956 |

FOREIGN PATENTS

| | | |
|---|---|---|
| 554,602 | Great Britain | July 12, 1943 |